2,867,647

PENTAERYTHRITOL TETRANITRATE

Robert Stewart Gow, Fairlie, Scotland, John Frederick Williamson, deceased, late of Ardrossan, Scotland, by Audrey Joy Williamson, executrix, Saltcoats, Scotland, assignors to Imperial Chemical Industries Limited, London, England, a corporation of Great Britain No Drawing. Application February 4, 1957
Serial No. 637,888

6 Claims. (Cl. 260—467)

The present invention is concerned with improvements in or relating to pentaerythritol tetranitrate and more particularly to improvements in its flowing properties and to a process for treating it to achieve said improvements.

Difficulty is often experienced with pentaerythritol tetranitrate because of its tendency not to flow freely through narrow perforations as for example in the charging of detonator tubes with pentaerythritol tetranitrate it tends to build up in the small perforations of the charging plate of a detonator charging machine, and also in the manufacture of detonating fuse.

The object of the present invention is to improve the flowing properties of pentaerythritol tetranitrate by providing the discrete particles thereof with a coating of a surface active agent of the kind which is free from any tendency to bring about their decomposition and which has no adverse effect on their heat stability.

According to the present invention pentaerythritol tetranitrate consists of discrete particles thereof having a deposit of at least one water-soluble non-ionic surface active agent for example particularly of at least one polyoxyethylene derivative of at least one higher fatty alcohol, of at least one organic acid amide, of at least one alkyl phenol, of at least one organic carboxylic acid containing at least 6 carbon atoms and in which derivative there is a chain of at least three ethyleneoxy groups.

The preferred polyoxyethylene derivative is the condensation product of an alkyl phenol with ethylene oxide.

The quantity of wetting agent can be between the limits 0.0004% and 0.05% and the preferred limits are between 0.0008% and 0.0025%, these limits being reckoned on the weight of dry pentaerythritol tetranitrate.

The improvement in the flowing properties of the dry pentaerythritol tetranitrate of the invention is shown by the increased number of detonator charges which can be passed through a charging plate of a detonator charging machine before the charging plate requires to be cleaned and that its heat stability is not adversely affected is shown by the results obtained in the Abel heat test. Furthermore the pentaerythritol tetranitrate of the invention has the same sensitivity to initiation as the pentaerythritol before treatment in accordance with the invention.

According to the present invention the process of treating pentaerythritol tetranitrate comprises applying to the discrete particles thereof a coating of a water-soluble non-ionic surface active agent for example particularly a coating of at least one polyoxyethylene derivative of at least one higher fatty alcohol, of at least one organic acid amide, of at least one alkyl phenol, of at least one organic carboxylic acid containing at least 6 carbon atoms and in which derivative there is a chain of at least three ethyleneoxy groups.

It is found that pentaerythritol tetranitrate treated in accordance with the invention improves the conductivity of the pentaerythritol tetranitrate and it would therefore seem that the coating of water-soluble non-ionic surface active agent acts as an anti-static agent and so allows any static charges on the crystals of pentaerythritol tetranitrate to dissipate through the charging plate of the detonator charging machine thus resulting in the pentaerythritol tetranitrate treated in accordance with the invention having improved flow properties.

Data for the volume resistivity of pentaerythritol tetranitrate untreated and treated with increased amounts of the condensation product of ethylene oxide with an alkyl phenol are given in the following table.

| Surface active agent, percent | Volume resistivity (ohms cm.) |
|---|---|
| ----- | Not measurable. |
| 0.001 | $150 \times 10^{10}$. |
| 0.01 | $9.1 \times 10^{10}$. |
| 0.05 | $3.4 \times 10^{10}$. |
| 0.1 | $2.2 \times 10^{10}$. |
| 0.25 | $1.5 \times 10^{10}$. |
| 0.5 | $1.2 \times 10^{10}$. |
| 1.0 | $1.3 \times 10^{10}$. |

A sample of pentaerythritol tetranitrate treated with 0.5% graphite is found to have a volume resistivity of $8,000 \times 10^{10}$ ohms cm. which indicates that the surface active agent referred to in the foregoing table is a much better anti-static agent than graphite.

Tests indicate that the treatment of pentaerythritol tetranitrate with up to 0.05% of the surface active agent noted above does not affect the stability of the pentaerythritol tetranitrate as measured by the Abel heat test and vacuum stability test. The impact and friction sensitivities of the pentaerythritol tetranitrate treated in this manner are also unaffected as measured in the fall hammer and torpedo friction tests. The addition of up to 0.3% of this non-ionic surface active agent does not increase the spark sensitivity.

The invention is illustrated by the following examples in which percentages are by weight, reckoned on the weight of dry pentaerythritol tetranitrate.

Example 1

1,000 lb. of pentaerythritol tetranitrate of the purity required in detonator manufacture is mixed for 5 minutes at room temperature with 900 lb. of water containing 0.5 lb. of the surface active agent, the condensation product of ethylene oxide with an alkyl phenol. The aqueous medium is then removed from the pentaerythritol tetranitrate by vacuum filtration. The pentaerythritol tetranitrate thus obtained is then dried in the usual manner to a moisture content of below 0.1% water. When the pentaerythritol tetranitrate, before said treatment, is used to charge detonator tubes the charging plate of the detonator charging machine has to be cleaned after 5 charges, whereas when pentaerythritol tetranitrate treated in said manner is used to charge detonator tubes the charging plate of the detonator charging machine can be used for 500 charges without cleaning.

Analysis shows that the pentaerythritol tetranitrate treated in the above manner contains 0.001% of the surface active agent and the pentaerythritol tetranitrate crystals are found to have a volume resistivity of $150 \times 10^{10}$ ohms cm. The untreated pentaerythritol tetranitrate is virtually a non-conductor of electricity.

The presence of 0.001% of the surface active agent has no effect on the melting point of the pentaerythritol tetranitrate or on its stability as judged by the Abel heat test and vacuum stability test and no effect on the impact and friction sensitivity or on the spark sensitivity of the pentaerythritol tetranitrate whether in powder or pressed form.

Example 2

10 lb. of the pentaerythritol tetranitrate referred to in Example 1 is mixed at room temperature with 3 lb. of water containing 0.005 lb. of the surface active agent referred to in Example 1 until the pentaerythritol tetranitrate is evenly wetted. The pentaerythritol tetranitrate treated in this way is then dried in the usual manner to a moisture content below 0.1% water.

The dry pentaerythritol tetranitrate contains 0.05% of the surface active agent and is found to have a volume resistivity of $3.4 \times 10^{10}$ ohms cm. With pentaerythritol tetranitrate treated in this manner the charging plate of a detonator charging machine can be used over 500 times without cleaning. The presence of said amount of the surface active agent has no effect on the stability, friction and impact sensitivity and spark sensitivity of the pentaerythritol tetranitrate.

Example 3

1,000 lb. of the pentaerythritol tetranitrate referred to in Example 1 is mixed at room temperature with 900 lb. of water containing 0.5 lb. of "Tween" 60 (a condensation product of a stearic acid ester of hexitol anhydride and ethylene oxide). The aqueous medium is then removed by filtration under vacuum and the pentaerythritol tetranitrate treated in this way is then dried in the usual manner to a moisture content below 0.1% water.

With pentaerythritol tetranitrate treated in this manner the charging plate of a detonator charging machine can be used over 500 times without cleaning. The presence of said amount of the surface active agent has no effect on the stability, and friction and impact sensitivity of the pentaerythritol tetranitrate.

Example 4

1,000 lb. of the pentaerythritol tetranitrate referred to in Example 1 is mixed at room temperature with 900 lb. of water containing 0.5 lb. of "Ethofat" 242/25 (a condensation product of a fatty acid and/or rosin acid and ethylene oxide). The aqueous medium is then removed by filtration under vacuum and the pentaerythritol tetranitrate treated in this way is then dried in the usual manner to a moisture content below 0.1% water.

With pentaerythritol tetranitrate treated in this manner the charging plate of a detonator charging machine can be used over 500 times without cleaning. The presence of said amount of the surface active agent has no effect on the stability, and friction and impact sensitivity of the pentaerythritol tetranitrate.

Example 5

1,000 lb. of the pentaerythritol tetranitrate referred to in Example 1 is mixed at room temperature with 900 lb. of water containing 0.5 lb. of "Ethomid" RO/20 (a condensation product of mixed fatty acid amides and ethylene oxide). The aqueous medium is then removed by filtration under vacuum and the pentaerythritol tetranitrate treated in this way is then dried in the usual manner to a moisture content below 0.1% water.

With pentaerythritol tetranitrate treated in this manner the charging plate of a detonator charging machine can be used over 500 times without cleaning. The presence of said amount of the surface active agent has no effect on the stability, and friction and impact sensitivity of the pentaerythritol tetranitrate.

What we claim is:

1. Pentaerythritol tetranitrate particles having a coating of water-soluble non-ionic surface active agent, said surface active agent consisting of at least one polyoxyethylene derivative having a chain of at least three ethyleneoxy groups and selected from the group consisting of polyoxyethylene derivatives of higher fatty alcohols, polyoxyethylene derivatives of organic acid amides, polyoxyethylene derivatives of alkyl phenols, and polyoxyethylene derivatives of organic carboxylic acids having at least six carbon atoms.

2. A process for improving the flowing properties of pentaerythritol tetranitrate which comprises applying to discrete particles thereof a coating of a water-soluble non-ionic surface active agent, said surface active agent consisting of at least one polyoxyethylene derivative having a chain of at least three ethyleneoxy groups and selected from the group consisting of polyoxyethylene derivatives of higher fatty alcohols, polyoxyethylene derivatives of organic acid amides, polyoxyethylene derivatives of alkyl phenols, and polyoxyethylene derivatives of organic carboxylic acids having at least six carbon atoms.

3. Pentaerythritol tetranitrate as claimed in claim 1 wherein said surface active agent is the condensation product of an alkyl phenol with ethylene oxide.

4. Pentaerythritol tetranitrate as claimed in claim 1 wherein the quantity of said surface active agent is between the limits 0.0004% and 0.05% reckoned on the weight of dry pentaerythritol tetranitrate.

5. Pentaerythritol tetranitrate as claimed in claim 4 wherein said limits are between 0.0008% and 0.0025%.

6. A process as claimed in claim 2 wherein said surface active agent is the condensation product of an alkyl phenol with ethylene oxide.

No references cited.